(12) United States Patent
Bryson et al.

(10) Patent No.: US 7,059,009 B2
(45) Date of Patent: Jun. 13, 2006

(54) WINDSHIELD WIPER DRIVE LINKAGE ARM WITH GROOVES

(75) Inventors: Bruce Allen Bryson, Arcanum, OH (US); Harry Charles Buchanan, Dayton, OH (US); Yaomin Dong, Rochester Hills, MI (US); James Preston Penrod, Ft. Thomas, KY (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 294 days.

(21) Appl. No.: 10/199,521

(22) Filed: Jul. 19, 2002

(65) Prior Publication Data

US 2004/0016075 A1    Jan. 29, 2004

(51) Int. Cl.
*F16C 11/06*    (2006.01)
*B60S 1/18*    (2006.01)
*B60S 1/24*    (2006.01)

(52) U.S. Cl. ............... 15/250.3; 15/250.31; 15/250.27; 403/122; 403/133; 74/579 R; 74/581; 74/42; 74/43; 74/584

(58) Field of Classification Search ............... 15/250.3, 15/250.31, 250.27; 403/122, 133, 135, 140, 403/2; 74/579 R, 581, 42, 584, 2
See application file for complete search history.

(56) References Cited

U.S. PATENT DOCUMENTS 987,760 A    3/1911    Spellings (Continued)

FOREIGN PATENT DOCUMENTS

DE    3843330    *    7/1990

(Continued)

OTHER PUBLICATIONS

U.S. Appl. No. 10/135,952 of Harry C. Buchanan, Jr. for Windshield Wiping Method filed Apr. 30, 2002.

*Primary Examiner*—Gary K. Graham
(74) *Attorney, Agent, or Firm*—Jacox Meckstroth & Jenkins

(57)    ABSTRACT

This invention relates to windshield wiper system and method which utilizes a flexible member to account for compression loads in excess of a predetermined load, such as 30 percent greater than a maximum load for the flexible member. The system utilizes a flexible pultruded composite material having a relatively low modulus of elasticity, yet relatively high elongation characteristics. The flexible arm bends to facilitate preventing damage to components in the wiper system when a compressive load applied to the flexible member reaches a predetermined load as a result of a fatigue condition, such as snow or ice build up on the windshield. In one embodiment, the predetermined load is defined as:

$$P_{CR} = KE = 1.3 P_{link};$$

where:

$P_{CR}$ = the predetermined load;

$P_{link}$ = a maximum normal running load for a comparably-sized steel or rigid link which does not flex;

$$K \text{ is a coefficient} = \frac{\pi^2 I}{L^2};$$

E is the flexural modulus (MPa)
and I is a moment of inertia in $mm^4$
and L is a length (mm) of flexible arm 28.

34 Claims, 12 Drawing Sheets

U.S. PATENT DOCUMENTS

| | | | |
|---|---|---|---|
| 1,313,764 A | | 8/1919 | Thurston |
| 1,448,517 A | | 3/1923 | Brady |
| 2,259,790 A | | 10/1941 | Auten |
| 2,744,282 A | | 5/1956 | Dyer et al. |
| 3,016,766 A | * | 1/1962 | Ernst .......................... 384/276 |
| 3,688,333 A | | 9/1972 | Cimino et al. |
| 4,318,201 A | | 3/1982 | Rogers et al. |
| 4,347,642 A | | 9/1982 | Bauer et al. |
| 4,550,469 A | * | 11/1985 | Deutscher et al. ....... 15/250.34 |
| 4,689,535 A | | 8/1987 | Tsunoda et al. |
| 4,736,487 A | | 4/1988 | Epple et al. |
| 4,949,421 A | | 8/1990 | Scorsiroli |
| 4,993,863 A | * | 2/1991 | Inoue ........................ 403/133 |
| 5,009,538 A | * | 4/1991 | Shirai et al. ................ 403/134 |
| 5,023,532 A | | 6/1991 | Gakenholz |
| 5,050,442 A | | 9/1991 | Reed |
| 5,117,168 A | | 5/1992 | Nomura et al. |
| 5,213,008 A | * | 5/1993 | Kanno et al. ............. 74/579 R |
| 5,241,248 A | | 8/1993 | Furukoshi |
| 5,245,259 A | | 9/1993 | Nakamura et al. |
| 5,404,085 A | | 4/1995 | Resch et al. |
| 5,430,908 A | | 7/1995 | Deng |
| 5,522,280 A | | 6/1996 | Bexten |
| 5,566,419 A | | 10/1996 | Zhou |
| 5,609,433 A | * | 3/1997 | Pazdirek et al. ............ 403/140 |
| 5,615,967 A | * | 4/1997 | Hellon ....................... 403/133 |
| 5,894,627 A | | 4/1999 | Irikura |
| 6,000,092 A | | 12/1999 | Irikura |
| 6,148,470 A | | 11/2000 | Buchanan, Jr. |
| 6,381,800 B1 | | 5/2002 | Buchanan, Jr. |
| 6,398,446 B1 | * | 6/2002 | Pazdirek et al. ............ 403/134 |
| 2003/0121119 A1 | | 7/2003 | Benoit et al. |

FOREIGN PATENT DOCUMENTS

| | | | |
|---|---|---|---|
| DE | 195 38 424 | | 11/1996 |
| EP | 0325853 A | | 8/1989 |
| EP | 0525850 A | | 2/1993 |
| EP | 0722866 | | 7/1996 |
| FR | 2669084 | | 5/1992 |
| FR | 2670255 | * | 6/1992 |
| FR | 2746739 | * | 10/1997 |
| WO | WO 01/85501 A | | 11/2001 |

* cited by examiner

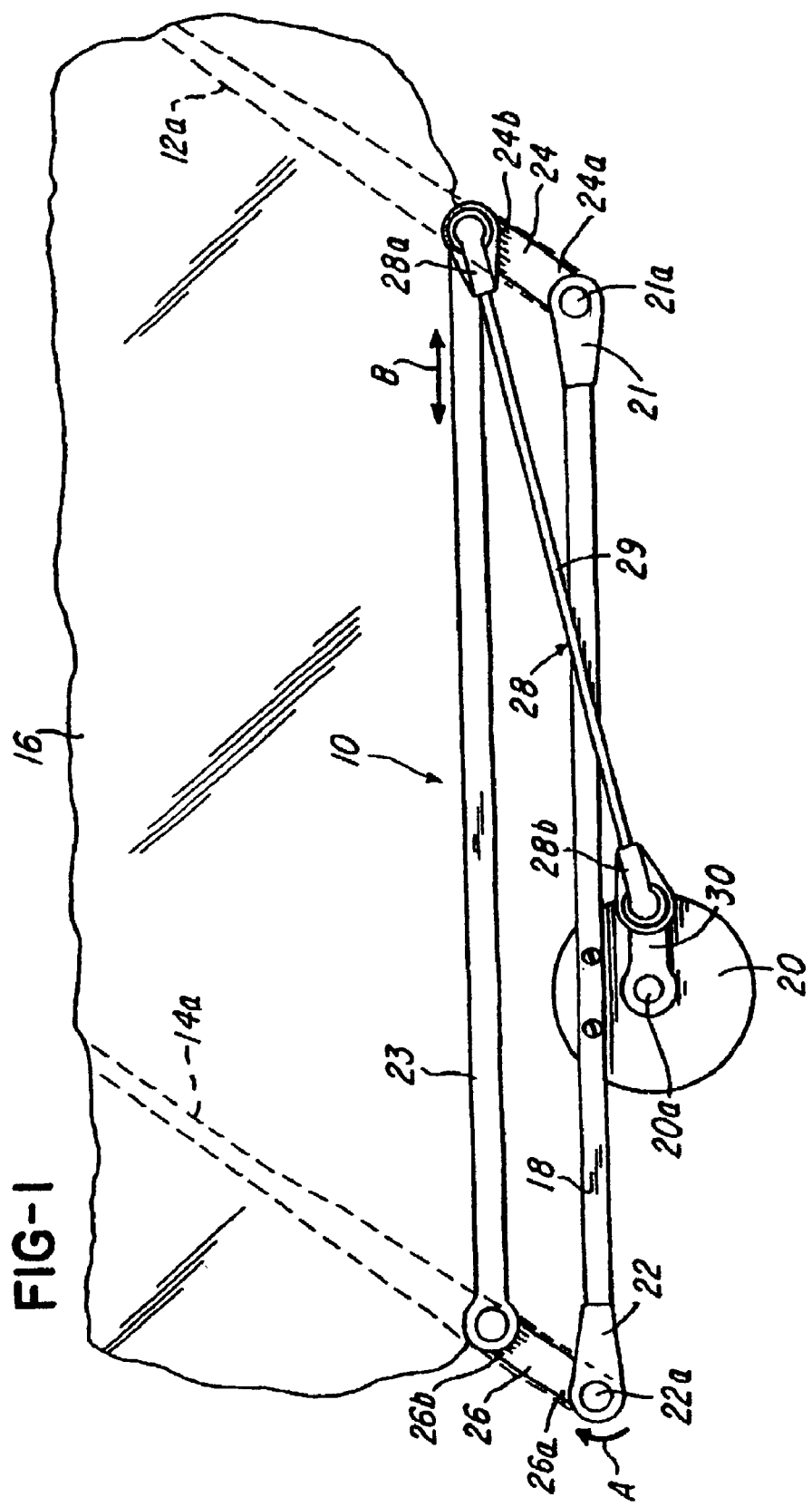

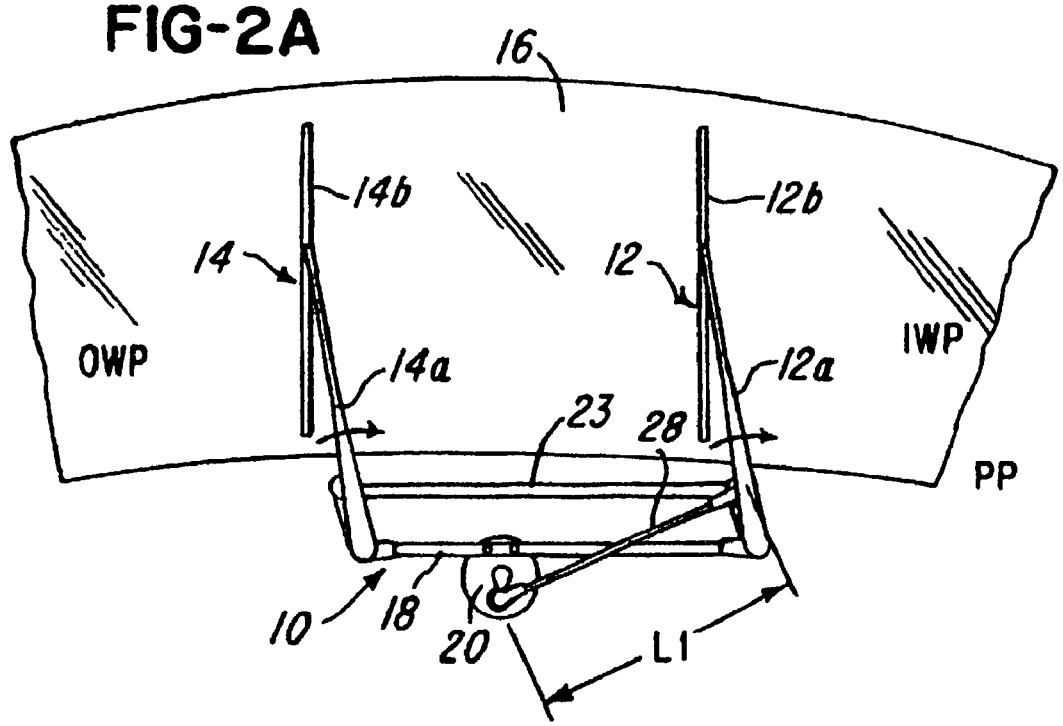
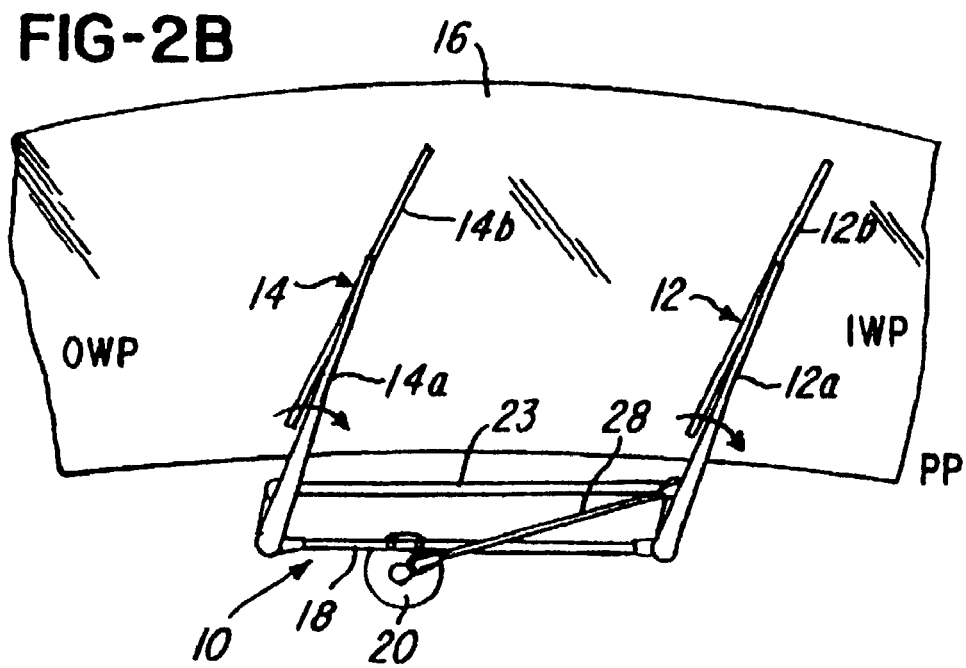

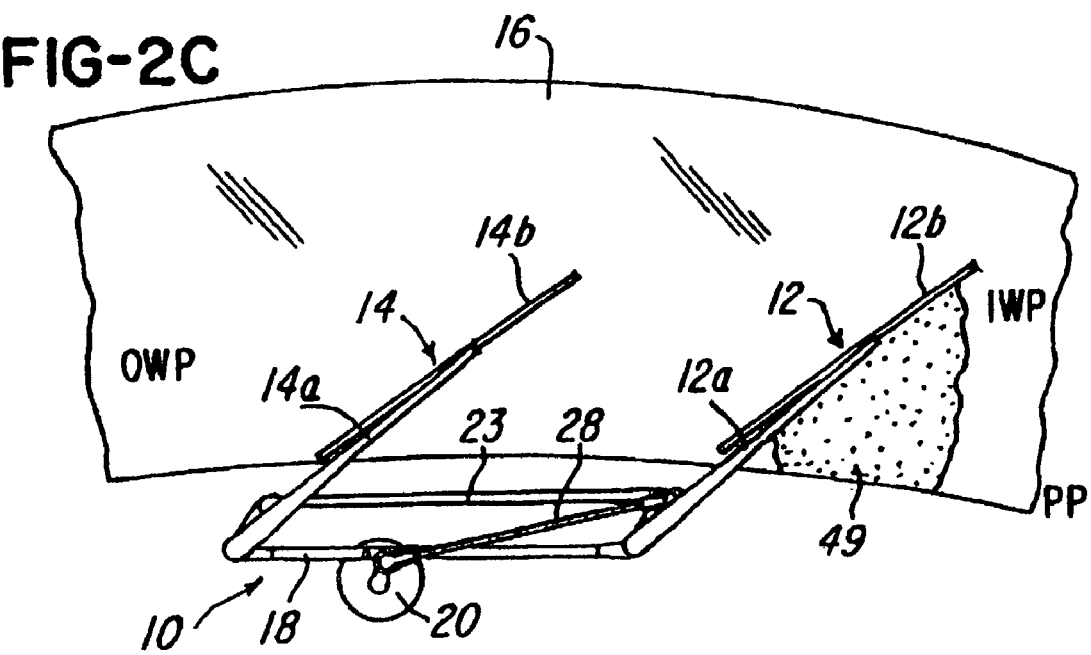
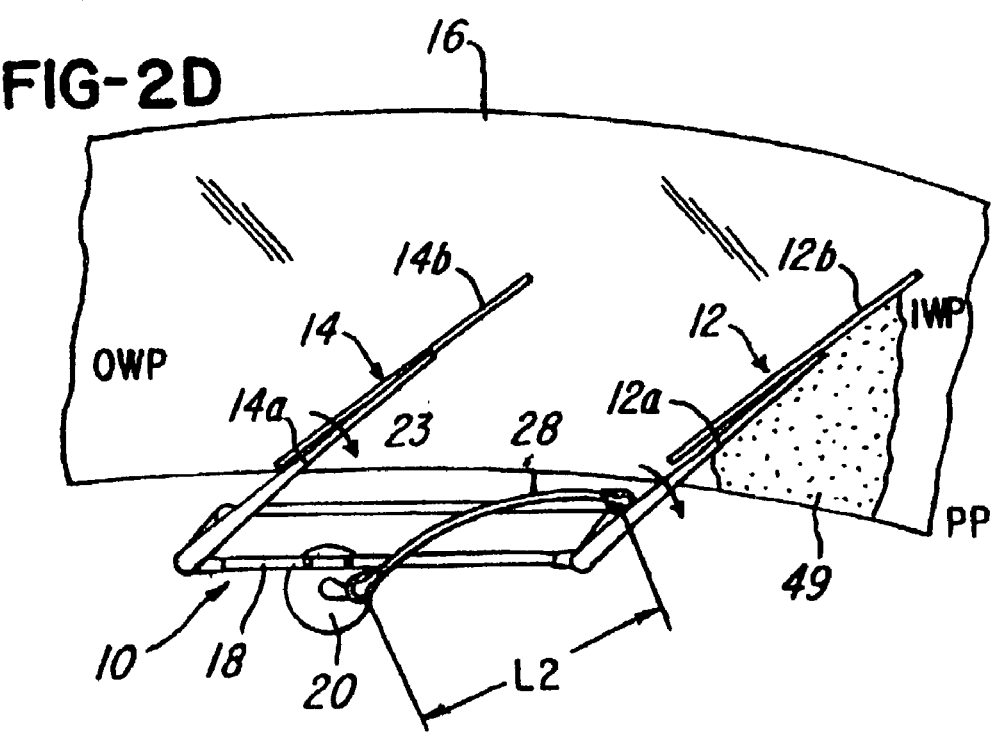

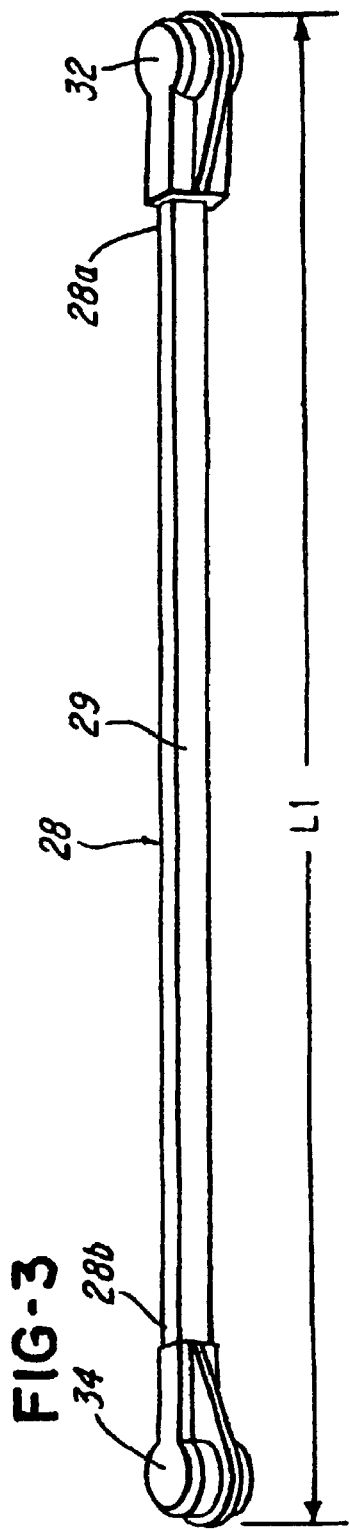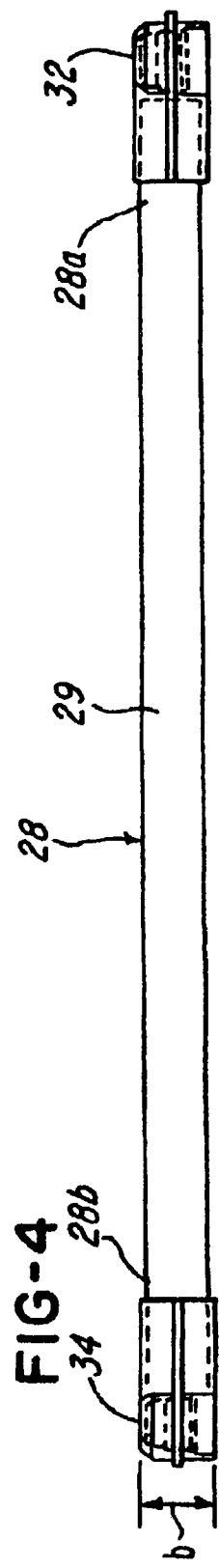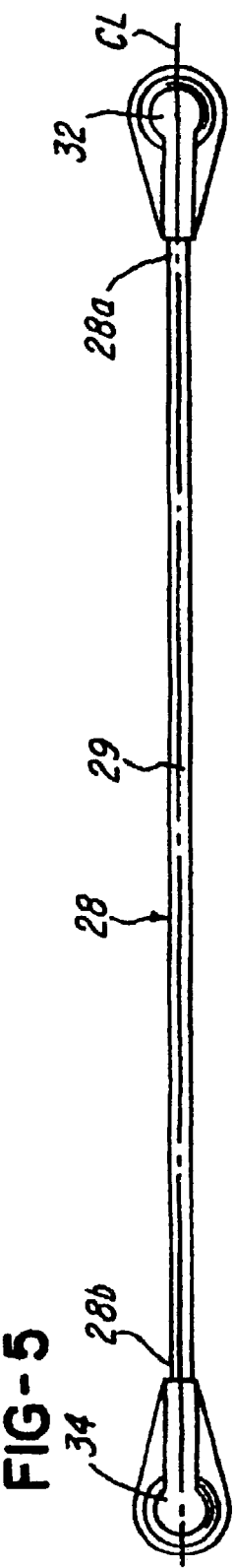

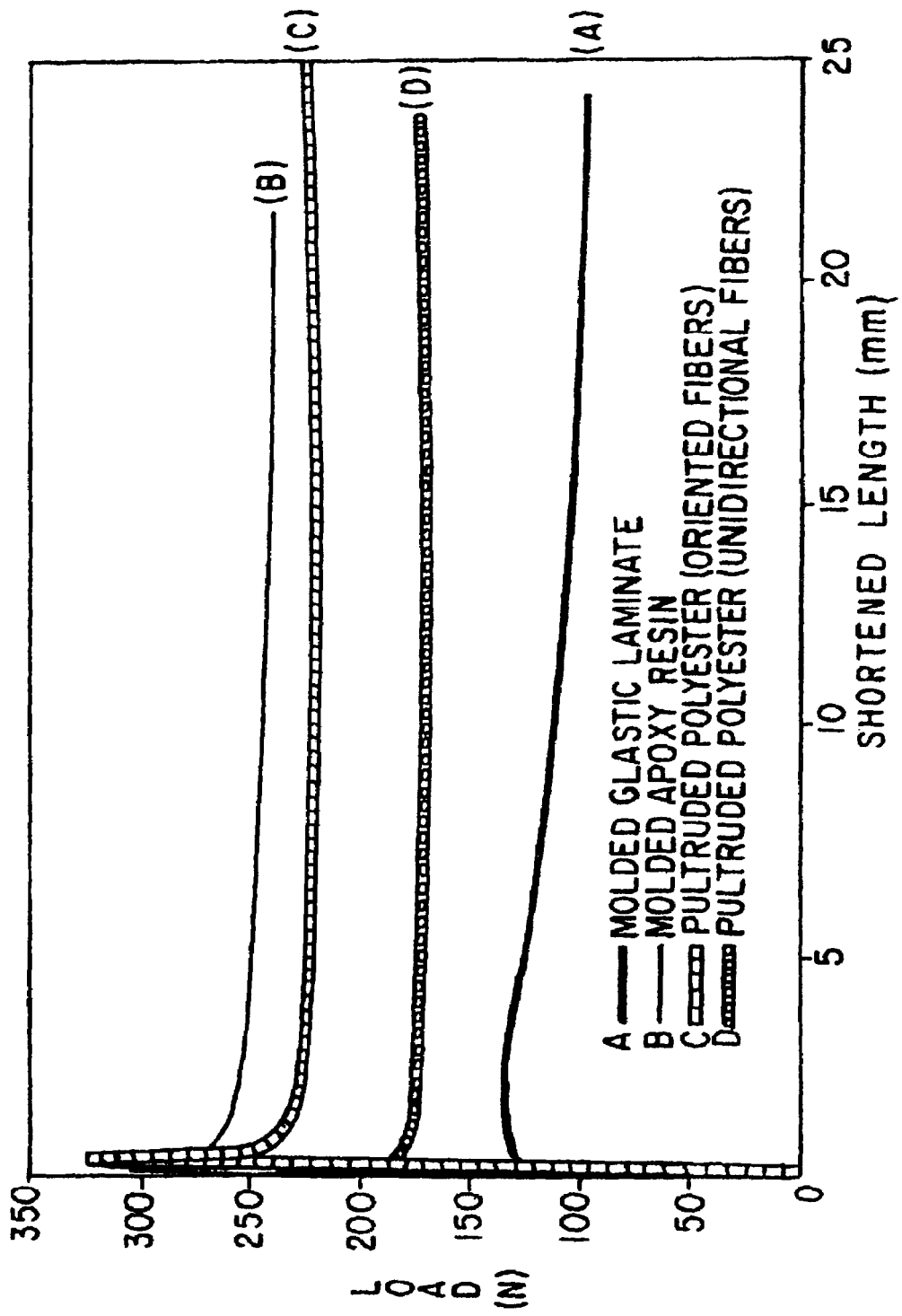

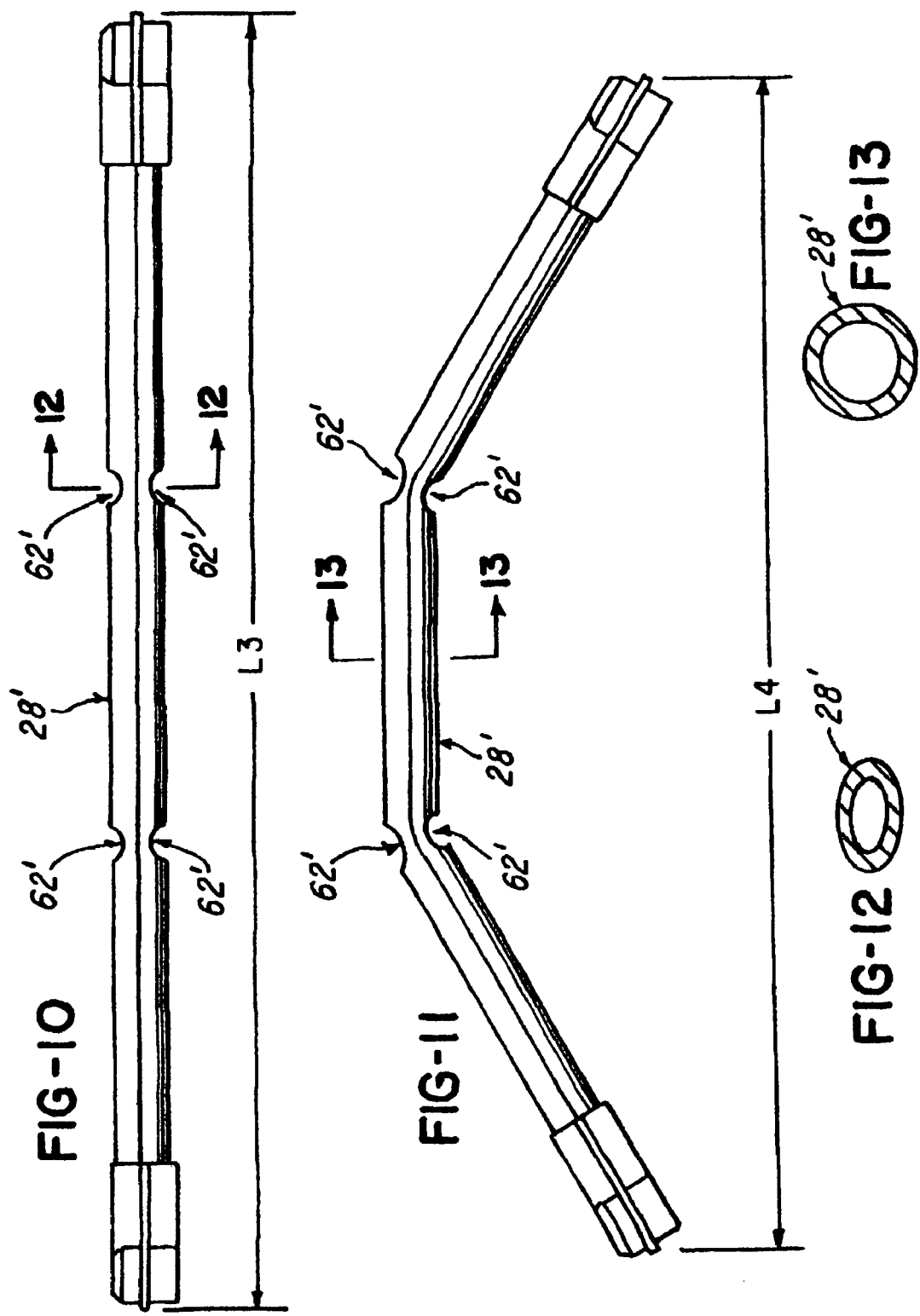

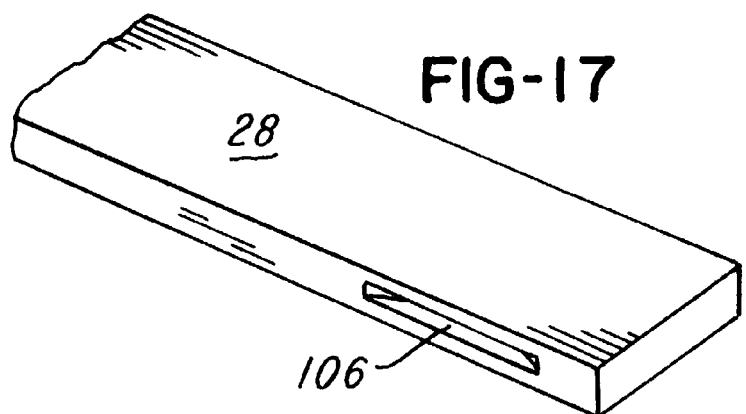
FIG-17
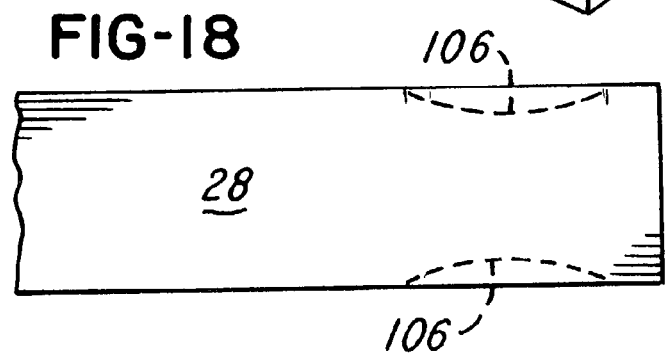
FIG-18
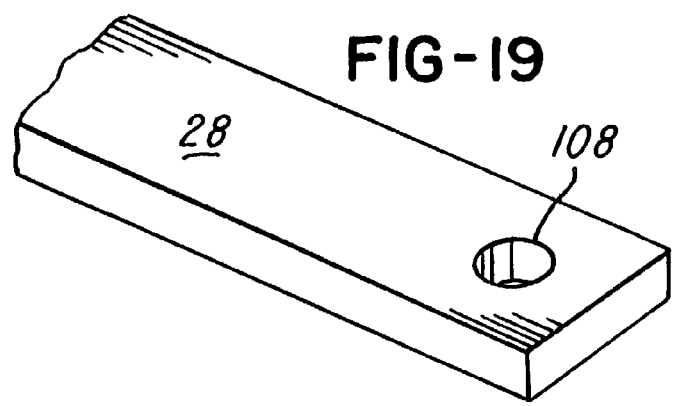
FIG-19
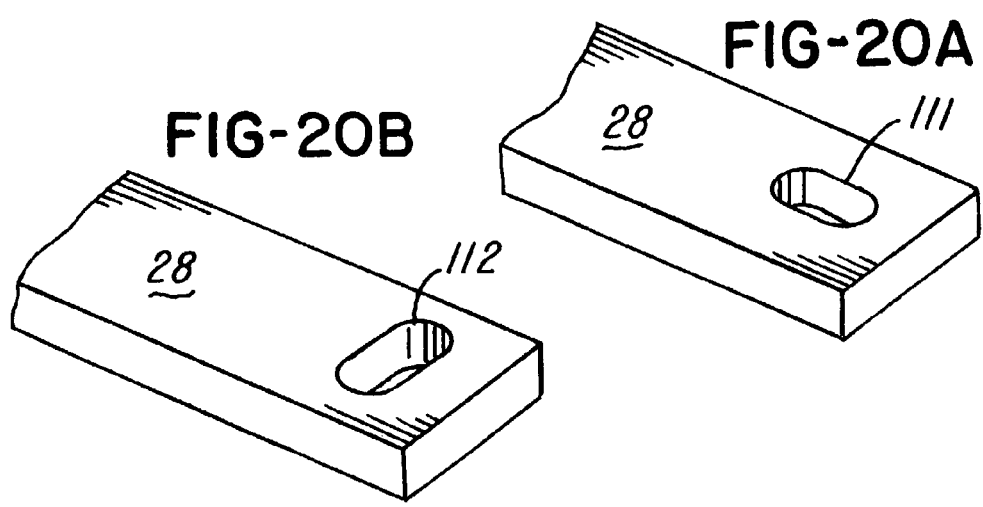
FIG-20A
FIG-20B

Fig. 23 (Table V)
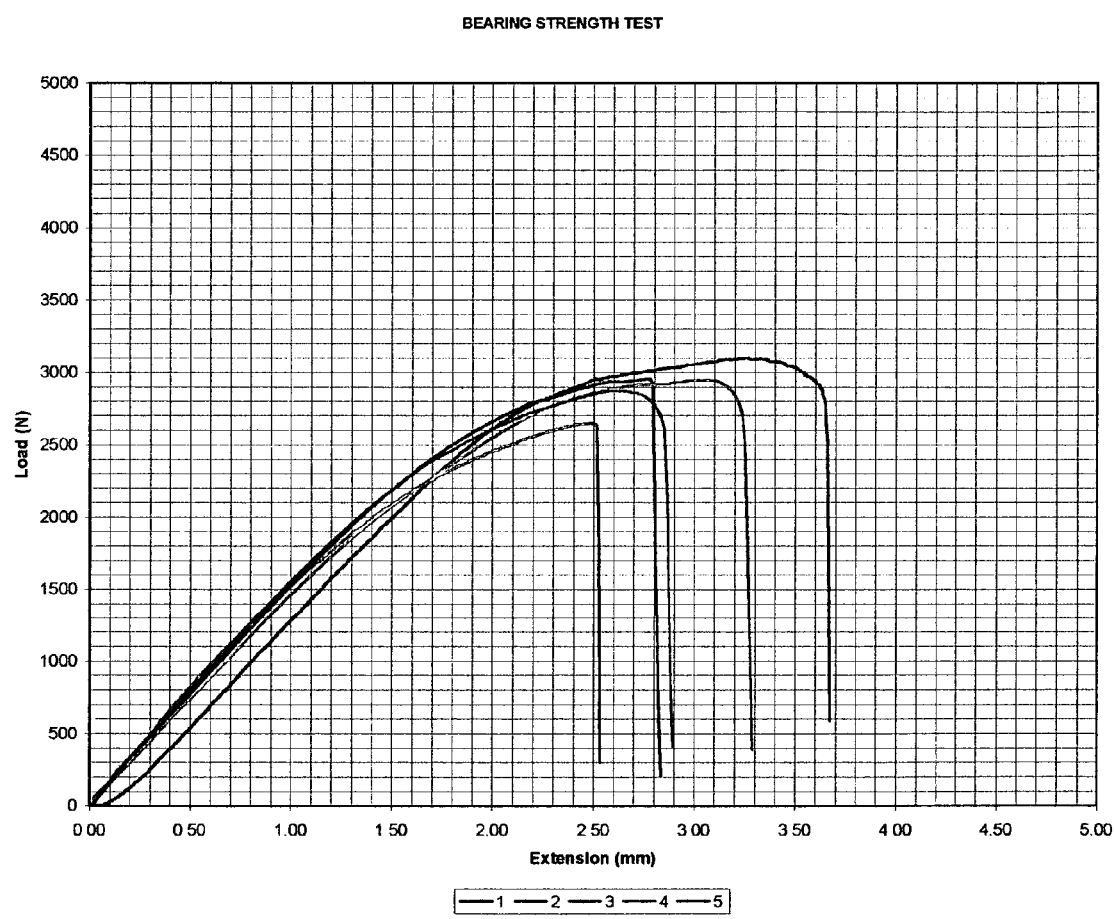

Fig. 24 (Table VI)
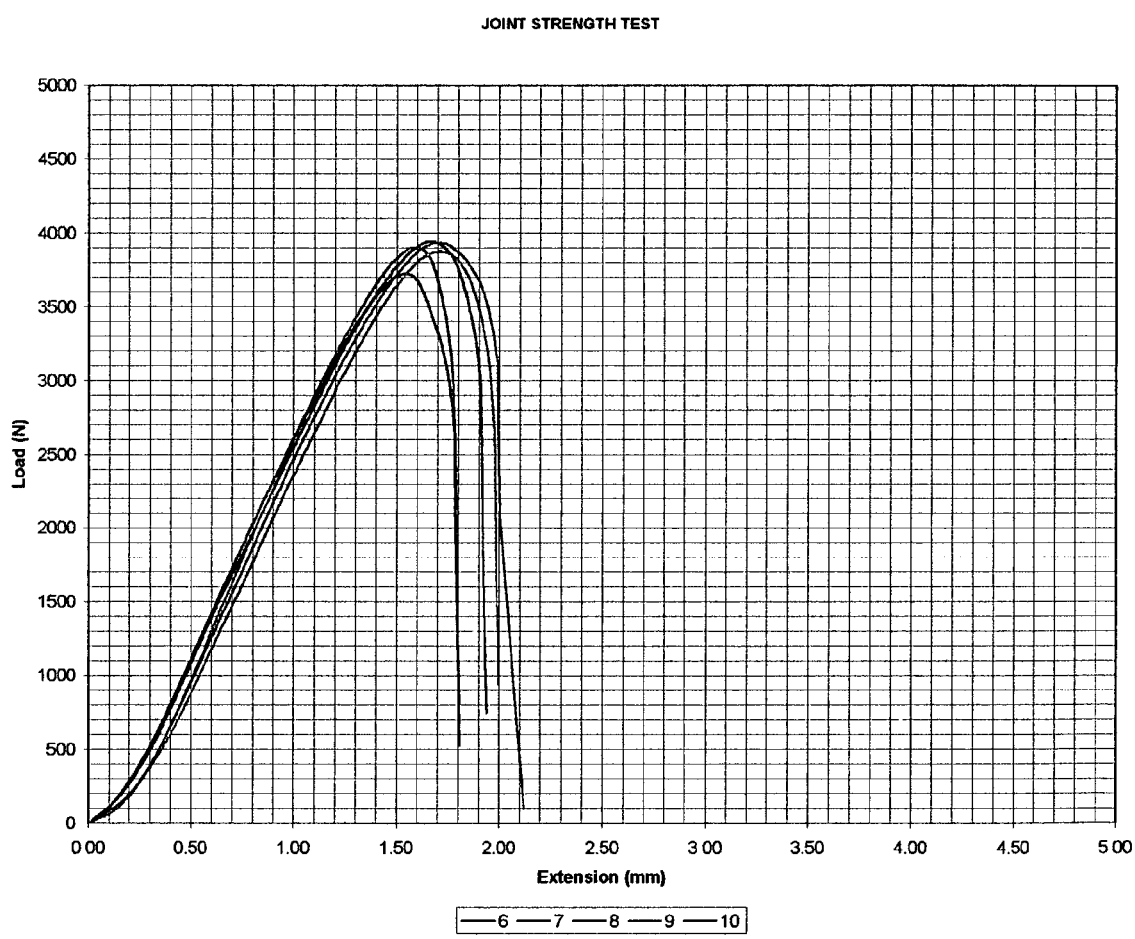

WINDSHIELD WIPER DRIVE LINKAGE ARM WITH GROOVES

BACKGROUND OF THE INVENTION

1. Field of the Invention

This invention relates to a windshield wiper system and, more particularly, to a windshield wiper system which utilizes at least one flexible member which bends or flexes to compensate for compression loads in excess of a predetermined load.

2. Description of the Related Art

In the field of windshield wiper systems, wiper arms having wiper blades thereon are driven from a park position, where the blades are often situated at either the bottom of or below a windshield of a vehicle, through an inwipe position, to an outwipe position. During normal wiping operations, the blades oscillate between the inwipe and outwipe positions to clean the windshield of debris or particles, such as ice, snow or other debris. It is not uncommon that snow or ice can accumulate on the windshield and prevent the wiper blades from, for example, fully retracting from the inwipe position to the park position when a user actuates a wiper switch to an off position.

When the debris blocks the wiper arms and blades, a considerable amount of stress is imparted on the wiper linkage and drive motor which drives the blades. For example, a motor drive link, which couples the drive shaft of the motor to the drive linkage which drives the wiper arms, often experiences a compressive force. The linkage members of the wiper systems have in the past been stiffened to reduce expansion and shrinkage in order to avoid changing the wipe pattern requirements for the vehicles. However, in freezing, snowy weather, the snow and ice packs at the bottom of the windshield causes a restriction in the movement in the wiper arm and blade. Because of the rigidity of the motor drive link, the housing which houses the drive gears of the drive motor may crack or break. It has also been experienced that one or more drive plates which directly or indirectly couple the drive link to other linkage have been known to fracture or crack.

U.S. Pat. Nos. 6,148,470 and 6,381,800 illustrate a composite arm, which are incorporated herein by reference and made a part hereof. Benefits of those inventions are taught in the article "A Novel Use of a Composite Material to Limit the Loads in Windshield Wiper Systems", Penrod, et al., Copyright 2001 Society of Automotive Engineers, Inc., which is incorporated herein by reference and made a part hereof.

Accordingly, what is needed is a simple, yet effective, linkage system which utilizes one or more linkage arms having a relatively low modulus of elasticity with relatively high elongation and fatigue properties to facilitate avoiding the problems of the past.

SUMMARY OF THE INVENTION

In one aspect, this invention comprises a windshield wiper drive linkage for use in a wiper system comprising a plurality of linkage arms, at least one of said plurality of linkage arms comprising a composite flexible arm which bends to facilitate preventing damage to components in the wiper system when a compressive load applied to at least one of the plurality of linkage arms exceeds a predetermined load as a result of a fatigue condition, the at least one of said plurality of linkage arms comprising a plurality of grooves on each end to facilitate providing an interlocking joint when a connector is overmolded onto each end.

In another aspect, this invention comprises a wiper system comprising a first wiper, a second wiper, a windshield wiper drive linkage coupled to said first and second wipers, a drive motor coupled to the windshield wiper drive linkage; and the windshield wiper drive linkage comprising a plurality of linkage arms coupled to the first and second wipers and the drive motor, at least one of the plurality of linkage arms comprising a composite flexible arm which bends to facilitate preventing damage to components in the wiper system when a compressive load applied to the at least one of the plurality of linkage arms exceeds a predetermined load as a result of a fatigue condition, the at least one of the plurality of linkage arms comprising a plurality of grooves on each end to facilitate providing an interlocking joint when a connector is overmolded onto each end.

Other objects and advantages of the invention will be apparent from the following description, the accompanying drawings, and the appended claims.

BRIEF DESCRIPTION OF ACCOMPANYING DRAWINGS

FIG. 1 is a general schematic view of a wiper blade drive and linking system in accordance with one embodiment of the invention;

FIGS. 2A–2D are illustrations of the wiper blade assembly of FIG. 1 as it is driven from an outwipe position towards inwipe and park positions;

FIG. 3 is a perspective view of a flexible member in accordance with one embodiment of the invention;

FIG. 4 is a front view of the flexible member shown in FIG. 3;

FIG. 5 is a plan view of the flexible member shown in FIG. 3;

FIG. 9 is graphical representation of a relationship between a compressive load for the flexible member relative to the length of the member as it shortens and flexes when the compression load exceeds a predetermined amount;

FIG. 10 is an illustration of another flexible member in accordance with another embodiment of the invention;

FIG. 11 is a illustration of the flexible member shown in FIG. 10 showing a shortened length L4;

FIG. 12 is a sectional view taken along the line 12—12 in FIG. 10;

FIG. 13 is a sectional view taken along the line 13—13 in FIG. 11;

FIG. 17 is a side view of a composite link socket attachment;

FIG. 18 is a plan view of a composite link socket attachment;

FIG. 19 is a perspective view of another embodiment of the invention;

FIG. 20A and FIG. 20B illustrate another embodiment of the invention;

FIG. 23 is a graph illustrating various features of the invention; and

FIG. 24 is another graph illustrating further load characteristics of the invention.

DETAILED DESCRIPTION OF THE PREFERRED EMBODIMENTS

Figure 6:
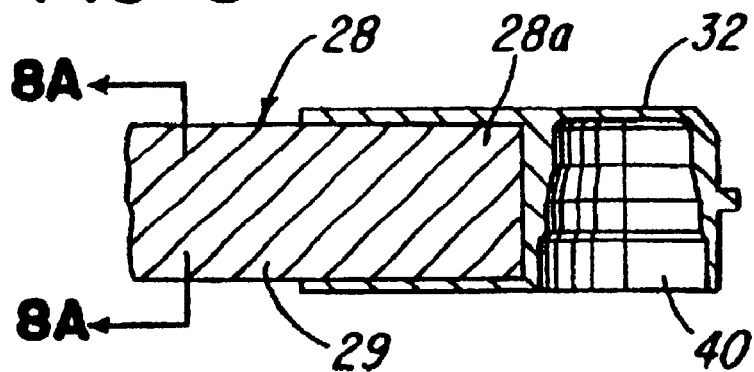
FIG. 6 is a fragmentary sectional view of an end cap situated on the flexible member.

Referring now to FIGS. 1 and 2A–2D, a windshield wiper system 10 is shown comprising a first wiper 12 and a second wiper 14 for wiping a windshield 16. The wiper 12 comprises a wiper arm 12a and blade 12b, and wiper 14 comprises a wiper arm 14a and blade 14b.

The wiper system 10 further comprises a windshield wiper drive linkage or linking means 18 comprising a first link arm 18 on which a drive motor 20 is fastened thereto by conventional means, such as a weld, nut and bolt, or the like. Notice that the frame link 18 comprises a first pivot housing 21 and a second pivot housing 22 which is secured thereto. The housings 21 and 22 comprise a first rotatable pivot housing shaft 21a and a second rotatable pivot housing shaft 22a which are drivingly coupled to wiper arms 12a and 14a (shown in phantom in FIG. 1), respectively.

The first rotatable pivot housing shafts 21a is coupled to a first end 24a of a drive plate 24. Likewise, the pivot housing shaft 22a is secured to a first end 26a of a second drive plate 26, as best illustrated in FIG. 1. An operating or "slave" link 23 couples a second end 24b of first drive plate 24 to a second end 26b of second drive plate 26 such that the drive plates 24 and 26 operate synchronously to rotatably drive the pivot housing shafts 21a and 22a in the direction of arrow A, thereby driving the wiper blades 12b and 14b.

The linkage or linking means 18 further comprises a motor drive link or flexible arm 28 having a first end 28a coupled to the second end 24b of the drive plate 24. The motor drive link or flexible arm 28 further comprises a second end 28b which is coupled to an output shaft 20a of motor 20 via a crank arm 30. In this regard, the crank arm 30 comprises a crank arm ball (not shown) and the drive plate 24 comprises a drive plate ball (not shown).

The arm 28 comprises an elongated rectangular member 29 (FIGS. 3–5) comprising a socket 32 and socket 34 which are over-molded thereon. As best illustrated in FIGS. 3–6, the first end 28a of motor drive link or flexible arm 28 comprises the socket 32 for mounting onto the drive plate ball (not shown) on drive plates 24, and second end 28b of motor drive link or flexible arm 28 comprises the socket 34 for receiving crank arm ball (not shown) on crank arm 30. As best illustrated in FIGS. 3–7, the first and second ends 28a and 28b comprise the sockets 32 and 34, respectively. Notice that socket 32 (FIG. 6) defines a socket area 40, respectively. It has been found that it is desirable to align the centerline CL (FIG. 5) with the axis of shafts 20a, 22a and 24a when the wipers 12 and 14 are in the park position.

As best illustrated in FIGS. 2A–2C and 3, flexible arm 28 defines a length L1, which in the embodiment being described is in excess of 250 mm. During a fatigue condition, when the compressive load applied to the arm 28 exceeds a predetermined load (such as at least 30 percent of a maximum working load of flexible member 28 as defined below), the flexible arm 28 begins to flex or bend. This causes the flexible arm 28 to shorten to a length L2, illustrated in FIG. 2D, and this length L2 is shorter than length L1. As illustrated in the graphs shown in FIG. 9 which are referred to and described later herein, the compressive load remains substantially constant as the flexible arm 28 continues to bend or flex and shorten for at least 5 mm after the compressive load achieves the predetermined load.

Figure 8A:
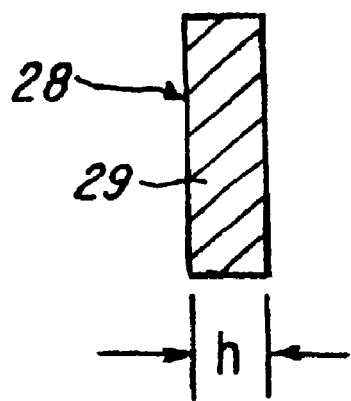
FIG. 8A is a sectional view taken along the line 8A—8A in FIG. 6.

As illustrated in FIGS. 3–5, the flexible arm 28 is preferably made from a composite material of the type described later herein relative to Table 1. As best illustrated in FIG. 8A, the flexible arm 28 is generally rectangular in cross-section and is generally elongated (FIGS. 3–5). It should be appreciated that the member 28 could be elliptical, circular or of some other geometry as desired. In the embodiment being described, the length L1 (FIGS. 2A and 3) of flexible arm 28 is on the order of at least 250 mm, but it could be any suitable length depending on the application.

Figure 7:
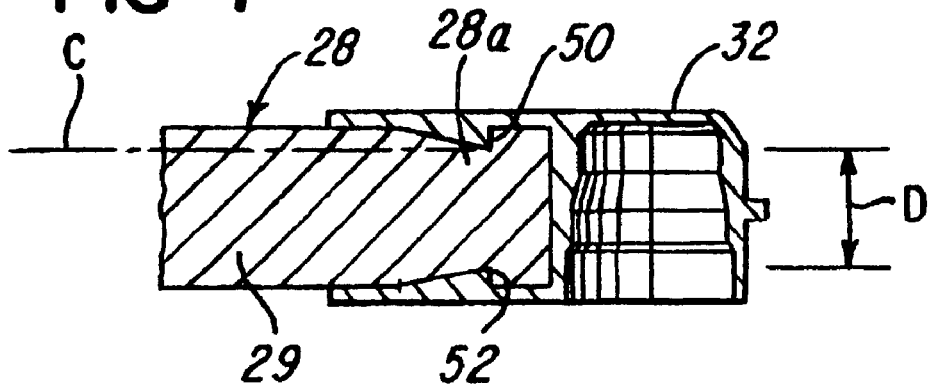
FIG. 7 is a view similar to FIG. 6 showing a plurality of shear areas to enable the cap to separate from the flexible member when a shear stress exceeds a predetermined amount.

FIG. 7 illustrates another embodiment of the invention where the flexible member 28 may be provided with sockets 32 and 34 with shear relief areas 50 and 52 which enable the end caps 32 and 34 to shear away or separate from member 29 when a predetermined stress is applied to the flexible member 28. Preferably, the predetermined stress is selected to be just slightly below a break point or maximum load of the member 29 so that, when the member 29 is about to reach its break point, one or more of the sockets 32 or 34 are permitted to shear and separate themselves from member 29 to avoid breakage. As illustrated in FIG. 7, line C defines a shear plane $A_S=LW$ and a minimal cross section $A_C=HW$, as shown by line D in FIG. 7. The shear stress along shear plane should not exceed the shearing strength which is defined as follows:

$$T = P/A_S = P/LW \leq T_y$$

where:
$A_S = LW$
L = a length of shear plane (line C);
W = a width of member 28;
P = tensile load on member 28 as measured experimentally;
T = shear stress of member 28; and
$T_y$ = yield shear stress of member 28.

A tensile stress on the minimum cross section should not exceed a yield stress as follows:

$$S = P/A_C = P/HW \leq S_y$$

Where:
S = a tensile stress of member 28;
$S_y$ = a yield stress of member 28;
P = a tensile load on member 28 as measured experimentally;
H = a height of member 28; and
W = a width of member 28.

The general operation of the linkage 18 will now be described relative to FIGS. 1 and 2A–2D. When a user actuates a wiper switch (not shown) the drive motor 20 is energized to cause the wipers to move from a park position (PP) through an inwipe position (IWP) towards an outwipe position (OWP), back to the inwipe position and so on. When the user turns the switch to an off position (not shown), the drive motor 20 drives the crank arm 30 to drive the motor drive link or flexible arm 28 to attempt to drive wipers 12 and 14 from the inwipe position to the park position. The motor 20 rotatably drives crank arm 30 which, in turn, drives the motor drive link or flexible arm 28 to drive the second end 24b of drive plate 24 in the direction of arrow B in FIG. 1. The operating link 23 responds by directly driving second end 26b of drive plate 26. The movement of drive plates 24 and 26, in turn, rotatably drive the pivot housing shafts 21a and 22a, respectively, to drive the first and second wipers 12 and 14 across the face of windshield 16 in response to rotation of the motor drive shaft 20a.

As best illustrated in the FIGS. 2C and 2D, an excessive load condition may occur when snow, ice or some other material or condition (illustrated as 49 in FIGS. 2C and 2D) prevents the wiper blades from moving, for example, from the inwipe position to the park position. However, the motor 20 continues to drive the motor drive link or flexible arm 28. Consequently, a compressive force or load is applied to the arm 28. The flexible arm 28 bends or flexes to facilitate preventing damage to the various components in the wiper system 10 when the load applied to the flexible arm 28 exceeds a predetermined load described later herein. Thus, it should be appreciated, that the flexible arm 28 flexes to accommodate the compressive force or load mentioned earlier when the compressive force or load exceeds the predetermined load.

In the embodiment being described, it was determined empirically that, when the predetermined load was established is at least 130 percent or more of a maximum normal running load, the arm 28 remained rigid enough to handle the normal wiping, yet flexible enough to bend during fatigue conditions. Thus, when the predetermined load exceeds about 130 percent of the maximum normal running load for the flexible arm 28, the wiper system 10 was able to operate with maximum efficiency, while protecting the components of the system 10. In the embodiment described, the predetermined load is defined as follows:

$$P_{CR} = KE = 1.3 P_{link}$$

where:

$P_{CR}$=the predetermined load;

$P_{LINK}$=a maximum normal running load for a comparably-sized steel or rigid link which does not flex;

K is a coefficient given by the relation:

$$K = \frac{\pi^2 I}{L^2}$$

E is the flexural modulus (MPa);
I is a moment of inertia in mm$^4$; and
L is a length (mm) of flexible arm 28.

Figure 8B:
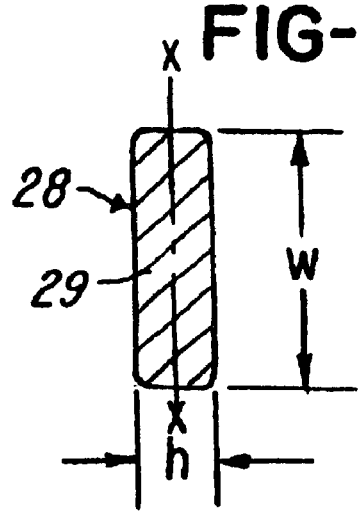
FIG. 8B is a sectional view similar to FIG. 8A showing a flexible member with rounded corners.
Figure 14:
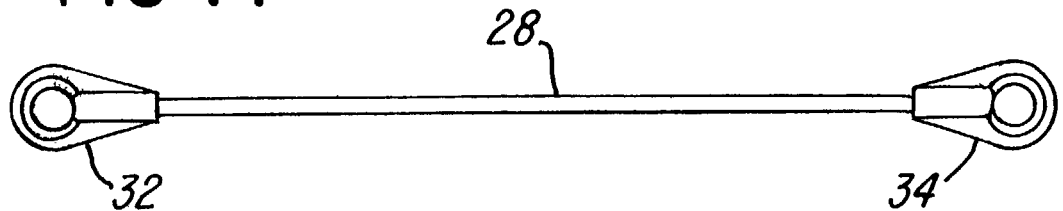
FIG. 14 is a detailed drawing of a flexible arm.

If the cross-sectional shape of member 28 is rounded on its edges as shown in FIG. 8B, then the formula for the area moment of inertia (I) is calculated using the following equation:

$$I = \frac{1}{12} W(h-2r)^3 + \frac{1}{6}(b-2r) + \frac{1}{2}r(h-r)^2(b-2r) + \frac{1}{4}[r+(h-2r)^2]$$

where W, H and R are width, height and fillet radius, respectively, of the cross-section of member 28 shown in FIG. 8B.

Eight samples of composite material with dimensions as shown in Table 1 below were made and tested using an Instron testing machine. The load and displacement were recorded and the testing results are shown in Table 1 and in the graph illustrated in FIG. 9.

As illustrated in Table I, the four different composite materials included a molded glass laminate provided by Red Seal Electric Company of Cleveland, Ohio; a molded epoxy resin provided by International Paper of Hampton, S.C.; a protruded polyester with oriented glass fibers provided by National Composite Center of Dayton, Ohio; and a protruded polyester with unidirectional glass fibers provided by Polygon Company of Walkerton, Ind.

It should be apparent from the Table I that the actual loads ($P_{crit-Exp.}$) compared vary favorably to theoretical loads ($P_{crit-Theory}$).

TABLE I

| Material | L1 (mm) (FIG. 3) | b (mm) (FIG. 4) | h (mm) (FIG. 8) | Pcrit-Exp. (N) | Pcrit-Theory (N) |
|---|---|---|---|---|---|
| 1. Glastic Laminate | | | | | |
| 1a. | 253 | 12.7 | 3.3 | 61.71 | 68.74 |
| 1b. | 253 | 19.09 | 3.3 | 94.96 | 103.33 |
| 1c. | 253 | 25.32 | 3.3 | 131.91 | 137.05 |
| 2. Epoxy Resin (IP) | | | | | |
| 2a. | 253 | 12.7 | 3.18 | 106.23 | 97.69 |
| 2b. | 253 | 19.09 | 3.18 | 206.52 | 146.85 |
| 2c. | 253 | 25.32 | 3.18 | 290.02 | 238.47 |
| 3. Polyester (NCC) | 300 | 20 | 3.4 | 190.02 | 238.47 |
| 4. Fiberglass | 305 | 31.7 | 2.42 | 237.98 | 219.10 |

FIG. 9 graphically illustrates the Instron testing machine results. Notice that, as the load on compressive arm 18 increased to in excess of 300 Newton, the flexible arm 18 began to bend or flex (as shown in FIG. 2D), thereby causing the load to be distributed across the flexible member 28. Notice that the load remains substantially constant even while the motor 20 (FIG. 1) continues to apply torque to the flexible arm 28.

FIGS. 10–13 illustrate another embodiment of the invention with like parts being identified with the same part numbers, except that a "prime" mark ("'") has been added thereto. In this embodiment, the flexible arm 28' has a generally circular cross-section (as shown in FIG. 13) and comprises a plurality of areas of flex 62' at areas where the flexible member 28' defines an oval shape in cross section, as shown in FIG. 12. The points of weakness permit the flexible member 28' to flex at the areas 62' when the compressive load exceeds the predetermined load, such as 30 percent higher than a maximum working load of the flexible member 28'. Notice that the flexible member 28' defines a length L3 (FIG. 10) which is greater than the length L4 shown in FIG. 11. It has been found that the difference between the length L3 and length L4, as 36well as the difference between length L1 and length L2 referred to in the embodiment described above, is directly proportional to the arcuate distance the drive motor 20 continues to drive the drive plate 24 (FIG. 1).

An ideal flexible member 28 would be perfectly rigid up to a predetermined load and perfectly elastic thereafter. Such a flexible member would have the stiffness necessary in excellent wipe pattern control, while yet limiting the peak loading of the system by elastic buckling at a predetermined yield load. It has been found that a composite link constructed as hereinafter described, provides a flexible member 28 which practically achieves such an operation. Post-buckling behavior of such a flexible member has been found to be very nearly rigid/perfectly plastic in nature. Preferably, flexible member 28 is pultruded from a composite material offering tremendous strain at fracture, allowing the member to undergo appreciable axial compression. For comparison purposes, the composite material is capable of 2.6% strain at fracture whereas 7000 series aluminum is 0.7% at yield, 1080 spring steel is 0.3% at yield, and 1009 CQ steel is 0.1% at yield.

When wiper system encounters a restriction in the wipe pattern, as illustrated in FIG. 2C, tremendous loads are generated. A composite link provides a solution to this problem. After the restriction has been encountered and the system loading has achieved a prescribed level, the composite link will buckle and become extremely compliant. FIG. 2D depicts this situation. Once the crank arm sweeps through the portion of the pattern that is restricted and the load diminishes, the composite link will unload and revert back to the unbuckled shape. The composite link has the added benefit of mass reduction since a composite link has only about 25% of the weight of its steel counterpart.

One of the problems in manufacturing a composite link assembly 28 arises in the attachment of sockets 32, 34. Testing results have shown that there is very little bonding strength if the sockets are directly overmolded onto smooth composite links. Therefore, the ends of the composite link bars have to be treated to provide enough bonding strength with the sockets and to avoid damaging the integrity of the resin-fiberglass structure. The following processes have been investigated:

A. Mechanical Interlock
  grooves top-bottom
  grooves side-side vertical
  grooves side-side horizontal
  grooves side-side at neutral axis Description of the Process Machining of the cross grooves and the edge grooves requires basically the same machine. The only difference is in the size of the fixture system. The preferred grooving machine is a dedicated milling machine with multiple diamond saws. The parts are loaded on a feeding system that holds the parts laying close to each other guides them under the multiple fixed saws. Since the saws are under and above the parts, both ends and both sides are done at the same time. The cycle time of this process is quite short because the process is running continuously and one operator can take care of several machines. This system can easily be used also to cut the parts at the length with the tolerance desired. For the machining of the axial grooves, the saws have to move with a vertical motion (down and back up) and the feeding system has to be indexed. This system is much more complicated than the one first described above one, and the cycle time is longer, because the system is not really continuous. Both sides and both ends can also be done at the same time with this configuration. This system can be used to cut at length the pultruded parts with the required accuracy.

B. Abrasive Processing
  grooves top-bottom
  grooves side-side vertical
  grooves side-side horizontal
  grooves side-side at neutral axis Description of the Process:

This is a grit blasting process wherein a small gun creates a stream of pressurized air for blasting an abrasive powder against a work surface. It requires an exhaust system for removal of the dust. The abrasive powder used for this application is aluminum oxide. The grit blast facility uses a feeding system (conveyor) for feeding the parts into the grit blasting machine. The links (single file) are fed past four pressure guns to perform the specific notch cutting operation. Both sides and both ends are done at the same time thanks to the four guns.

Process Parameters:
  Airpressure: 50 PSI
  Air consumption: 200 SCFM

Material Specification

Abrasive: aluminum oxide powder is recycled and runs in a closed loop, only 2% of the powder is lost during each shot.

Characteristics of the process—Flexible, but noisy. Tools wear rapidly and make lot of dust.

C-Laser Processing
  grooves top-bottom
  grooves side-side vertical
  grooves side-side horizontal
  grooves side-side at neutral axis Roughens the link surface by burning the resin and exposing glass fiber Description of the Process:

The system used to burn or cut the grooves in the composite link is a laser marking system. The laser is an EO Q-switched Nd: YAG operating in the second harmonic (532 nm). This kind of laser produces pulses approximately 15 ns wide and combines both thermal and ablative properties. The process is accomplished by putting the composite link beneath the beam of a laser that has been defocussed to reduce the power density. Nitrogen gas is blown just on the surface of the link to clear the debris. Only one side and both ends of the link can be done at the same time so the link has to be turned around by an operator. The links are put on a conveyor (feeding system) that is indexed after each cycle of the laser so that two ends of two links are in the action window of the laser. The system has also a cooling station and an exhaust system for the fumes.

Process Parameters:
  Nitrogen pressure: 30 PSI
  Vertical position precision needed: +/− 1/1000 inch
  Frequency: 0 to 50 Hz Material Specification:
  Cleaning gas: nitrogen, argon but not air (could burn)
  Crystal: Nd YAG Characteristics of the Process
  No noise
  No wear of the tools
  Very flexible but gas must be handled: argon or nitrogen D-Plasma Description of the Process:

The plasma burning station is composed of a power supply (same kind as the one for the plasma welding), two plasma torches and two motion systems. The two torches (one above and one under the composite links) are moved close to the still link by the motion systems controlled by a control station. The composite links are still and the operator puts them in the machine per batch. The plasma beam is a non-transferred beam (because the composite is not conductive) and is created by the electric power and argon gas that also protects the electrodes from oxidation. The beam is 1 inch above the surface of the composite so that it doesn't touch the link but creates such a high temperature that the resin of the composite burns but not the fibers. The system has also an exhaust system for the fumes and at least one operator for three plasma machines. The process has no noise and no wear on tools and is very flexible, but cannot be used to do grooves. This approach requires the use and handling of argon gas.

Figure 15A:
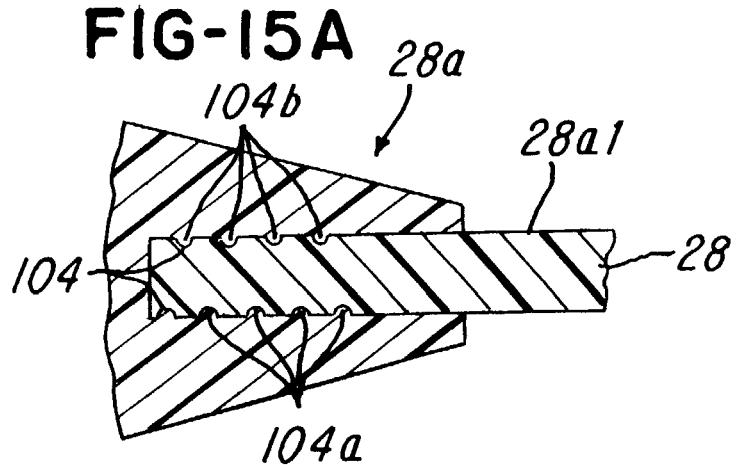
FIGS. 15A and 15B are drawings of first and second ends respectively of a flexible arm.
Figure 15B:
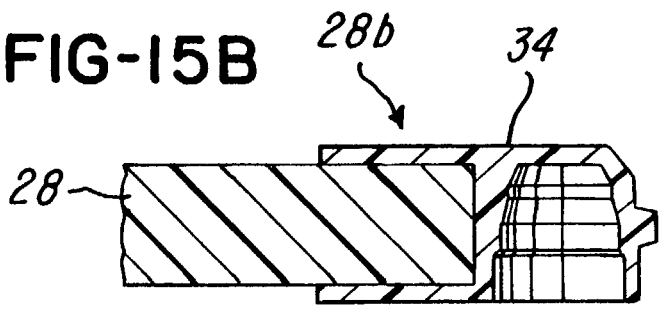
Figure 16:
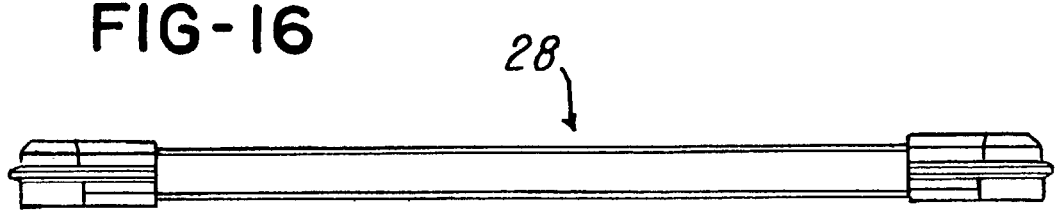
FIG. 16 is a drawing of a flexible arm looking in the direction 16—16 of FIG. 14.

Extreme caution should be used if the width, depth, spacing or number of grooves is changed or if the thickness of the pultruded rod is reduced below about 5.20 mm. When the member is buckled, the composite has a tendency to delaminate, a phenomenon which manifests itself by the appearance of small cracks at the roots of the grooves. Extensive development testing was completed in order to find a groove configuration that would meet the strength requirement when the link was in tension, yet not be subject to delamination at peak mid-span stress levels up to 690 MPa (100 ksi) that can occur when the composite link 28 is buckled. FIGS. 14, 15A, 15B and 16, particularly reference numeral 104 of FIG. 15A, illustrate the recommended top and bottom groove geometry. Note the two sets of grooves 104a and 104b (FIG. 15A). Note that the grooves 104 extend across the entire length W (FIG. 8B), but they could extend only part way across the width if desired. Also, they are shown to be linear, but they could comprise another shape, such as curved. FIGS. 17 and 18 show the side-by-side grooves 106 at the neutral axis of the link-bending plane. This design can reduce the peak bending stress where the glass fibers are removed, so that weakness is minimized. Finally, FIGS. 19, 20A and 20B show various alternative embodiments of circular and elongated or elliptic openings 108, 110 and 112, respectively, that may be used to provide the interlocking joint when one of the sockets 32 or 34 is overmolded thereon.

Special attention must be paid to the resin flow during the socket overmolding process. It is important to ensure that the Nylon material completely fill the grooves machined onto the composite rod. Table II presents a design of experiment (DOE) matrix comparing thirty-two configurations of the invention.

| | A<br>Grooves | C<br>Surface Finish | D<br>Socket Material | E<br>Attachment Method | e<br>Pultrusion Priming |
|---|---|---|---|---|---|
| 1 | smooth | smooth | nylon | insert mold | pultrusion w/o at-prime |
| 2 | smooth | ground axial fiber exposure | acetal | insert mold | pultrusion w/o at-prime |
| 3 | smooth | plasma axial fiber exposure | nylon | adhesive assy w/o surface primer | pultrusion w/o at-prime |
| 4 | smooth | laser axial fiber exposure | acetal | adhesive assy w/ surface primer | pultrusion w/ at-prime |
| 5 | machined axial grooves | smooth | nylon | insert mold | pultrusion w/ at-prime |
| 6 | machined axial grooves | ground axial fiber exposure | acetal | insert mold | pultrusion w/o at-prime |
| 7 | machined axial grooves | plasma axial fiber exposure | nylon | adhesive assy w/ surface primer | pultrusion w/ at-prime |
| 8 | machined axial grooves | laser axial fiber exposure | acetal | adhesive assy w/o surface primer | pultrusion w/o at-prime |
| 9 | machined cross grooves | smooth | acetal | adhesive assy w/o surface primer | pultrusion w/ at-prime |
| 10 | machined cross grooves | ground axial fiber exposure | nylon | adhesive assy w/ surface primer | pultrusion w/o at-prime |
| 11 | machined cross grooves | plasma axial fiber exposure | acetal | insert mold | pultrusion w/ at-prime |
| 12 | machined cross grooves | laser axial fiber exposure | nylon | insert mold | pultrusion w/o at-prime |
| 13 | machined edge grooves | smooth | acetal | adhesive assy w/ surface primer | pultrusion w/o at-prime |
| 14 | machined edge grooves | ground axial fiber exposure | nylon | adhesive assy w/o surface primer | pultrusion w/ at-prime |
| 15 | machined edge grooves | plasma axial fiber exposure | acetal | insert mold | pultrusion w/o at-prime |
| 16 | machined edge grooves | laser axial fiber exposure | nylon | insert mold | pultrusion w/ at-prime |
| 17 | laser axial grooves | smooth | acetal | insert mold | pultrusion w/ at-prime |
| 18 | laser axial grooves | ground axial fiber exposure | nylon | insert mold | pultrusion w/o at-prime |
| 19 | laser axial grooves | plasma axial fiber exposure | acetal | adhesive assy w/ surface primer | pultrusion w/ at-prime |
| 20 | laser axial grooves | laser axial fiber exposure | nylon | adhesive assy w/ surface primer | pultrusion w/o at-prime |
| 21 | laser cross grooves | smooth | acetal | insert mold | pultrusion w/o at-prime |
| 22 | laser cross grooves | ground axial fiber exposure | nylon | insert mold | pultrusion w/o at-prime |
| 23 | laser cross grooves | plasma axial fiber exposure | acetal | adhesive assy w/ surface primer | pultrusion w/o at-prime |
| 24 | laser cross grooves | laser axial fiber exposure | nylon | adhesive assy w/o surface primer | pultrusion w/ at-prime |
| 25 | grit blast cross grooves | smooth | nylon | adhesive assy w/o surface primer | pultrusion w/o at-prime |

-continued

| | A<br>Grooves | C<br>Surface Finish | D<br>Socket Material | E<br>Attachment Method | e<br>Pultrusion Priming |
|---|---|---|---|---|---|
| 26 | grit blast cross grooves | ground axial fiber exposure | acetal | adhesive assy w/ surface primer | pultrusion w/ at-prime |
| 27 | grit blast cross grooves | plasma axial fiber exposure | nylon | insert mold | pultrusion w/o at-prime |
| 28 | grit blast croos grooves | laser axial fiber exposure | acetal | insert mold | pultrusion w/ at-prime |
| 29 | ground cross grooves | smooth | nylon | adhesive assy w/ surface primer | pultrusion w/ at-prime |
| 30 | ground cross grooves | ground axial fiber exposure | acetal | adhesive assy w/o surface primer | pultrusion w/o at-prime |
| 31 | ground cross grooves | plasma axial fiber exposure | nylon | insert mold | pultrusion w/ at-prime |
| 32 | ground cross grooves | laser axial fiber exposure | acetal | insert mold | pultrusion w/o at-prime |

It should be appreciated that although the grooves are shown as illustrated in the figures, other groove configurations or arrangement of the grooves could be provided without departing from the scope of the invention. For example, it has been found that providing a different number of grooves on one surface, such as grooves, 104b on surface 28A1 in FIG. 15A and three grooves 104 on the opposite surface, such as grooves 104a on surface 28A2 in FIG. 15A, with the grooves 104a and 104b being arranged in a staggered configuration relative to each, other has been found to be the preferred configuration.

Table III represents further DOE relative to socket attachment for eighteen samples. Note that each sample had a predetermined surface finish (smooth, abrasive-fine, abrasive-coarse, chemically etched, laser etched); machine grooves (smooth, which means no grooves; top and bottom grooves as shown in FIG. 15A; and side-by-side grooves, as illustrated in FIG. 17); socket material from which the link 28 was made; the method by which the sockets 32 and 34 were mounted onto the ends 28A and 28B of arm 28; and protrusions having varying degrees of modulus. In the embodiment being described, the low modulus was provided to be about 40 percent glass filled, moderate modulus was about 50 percent glass filled and high modulus was provided to be about 60 percent glass filled in the embodiment being described.

TABLE III

DOE of Socket Attachment

| | 1 & 2<br>A<br>Surface finish | 3<br>B<br>Machined<br>grooves | 4<br>D<br>Socket<br>material | 5<br>E<br>Attachment/adhesives | 6<br>F<br>Pultrusions |
|---|---|---|---|---|---|
| 1 | smooth | smooth | nylon | insert mold/hot curing | low modulus |
| 2 | smooth | top-bottom | acetal #1 | mech attach/chem cure | moderate modulus |
| 3 | smooth | side-side | acetal #2 | insert mold/no adhesive | high modulus |
| 4 | abrasive-fine | smooth | nylon | mech attach/chem cure | moderate modulus |
| 5 | abrasive-fine | top-bottom | acetal #1 | insert mold/no adhesive | high modulus |
| 6 | abrasive-fine | side-side | acetal #2 | insert mold/hot curing | low modulus |
| 7 | abrasive-coarse | smooth | acetal #1 | insert mold/hot cunng | high modulus |
| 8 | abrasive-coarse | top-bottom | acetal #2 | mech attach/chem cure | low modulus |
| 9 | abrasive-coarse | side-side | nylon | insert mold/no adhesive | moderate modulus |
| 10 | chemical etch | smooth | acetal #2 | insert mold/no adhesive | moderate modulus |
| 11 | chemical etch | top-bottom | nylon | insert mold/hot curing | high modulus |
| 12 | chemical etch | side-side | acetal #1 | mech attach/chem cure | low modulus |
| 13 | laser etch #1 | smooth | acetal #1 | insert mold/no adhesive | low modulus |
| 14 | laser etch #1 | top-bottom | acetal #2 | insert mold/hot curing | moderate modulus |
| 15 | laser etch #1 | side-side | nylon | mech attach/chem cure | high modulus |
| 16 | laser etch #2 | smooth | acetal #2 | mech attach/chem cure | high modulus |
| 17 | laser etch #2 | top-bottom | nylon | insert mold/no adhesive | low modulus |
| 18 | laser etch #2 | side-side | acetal #1 | insert mold/hot curing | moderate modulus |

1. Low modulus: 40% glass filled
2. Moderate modulus: 50% glass filled
3. High modulus: 60% glass filled It should be appreciated that in the embodiment being described, the desired groove size, groove spacing and number of grooves is selected to provide a predetermined configuration that optimized the interlock between the socket, such as socket 32 and the arm 28. The following Table IV illustrates the various combinations of groove size, groove spacing and number of grooves selected.

TABLE IV

| | 1<br>A<br>Groove Size | 2<br>B<br>Groove Spacing | 3<br>C<br>Number of Grooves |
|---|---|---|---|
| 1 | small | #1 | few |
| 2 | small | #2 | moderate |
| 3 | small | #3 | many |
| 4 | medium | #4 | moderate |
| 5 | medium | #5 | many |
| 6 | medium | #6 | few |
| 7 | large | #7 | many |

TABLE IV-continued

| | 1<br>A<br>Groove Size | 2<br>B<br>Groove Spacing | 3<br>C<br>Number of Grooves |
|---|---|---|---|
| 8 | large | #8 | few |
| 9 | large | #9 | moderate |

1. Groove size:
Small: Radius = 0.5 mm
Medium: Radius = 1.0 mm
Large: Radius = 1.5 mm
2. Groove spacing: the distance between grooves
1: 2 mm
2: 3 mm
3: 4 mm
3. No. of grooves:
Few: 2
Moderate: 4
Many: 6

In the embodiment being described it was determined that the sample number 2 in Table III was preferred. This design was further tested by conducted bearing strength tests (pulling through the ball sockets 32 and 34 using the fixture 116 in FIG. 21B); a joint strength test (using the fixture 110 illustrated in FIG. 21A); a static strength (bearing) test (Table VII); and a spectrum buckling durability test (Table VIII).

Figure 21A:
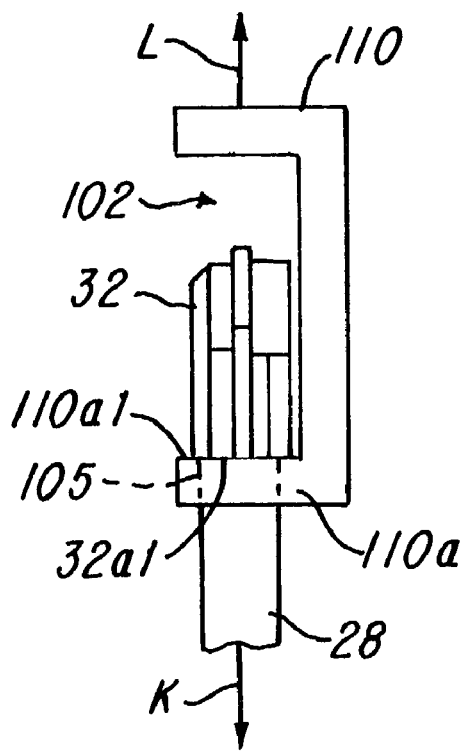
FIGS. 21A and 21B illustrate load characteristics of the invention.
Figure 21B:
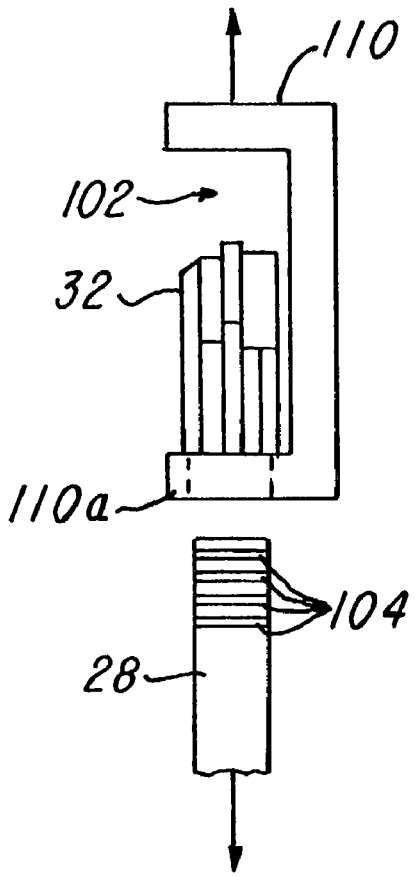

Two unique testing procedures were set up to test the strength of the interlock between the sockets 32 and 34 and the flexible arm 28. FIG. 21A illustrates a testing fixture 110 defining a U-shaped area 112 for receiving a socket 32 and having a wall 110a having a surface 110a1 for engaging an end 32a1. It should be appreciated that the wall 110a comprises a slot 105 substantially corresponding to the dimension H (FIG. 8A) so that it can receive the arm 28. The arm 28 and fixture 110 are moved in the direction of the arrows K and L until of the sockets 32 and/or 34 separate, as illustrated in FIG. 21B. The results of the tests using the sample 2 (Table III) is shown in the following Table V:

TABLE V

A. Bearing Strength Test (pull through ball sockets)

| Sample<br>No. | Pull Rate | Max Load<br>(N) | Fail Mode | Groove<br>Size<br>(mm) | Groove<br>Spacing<br>(mm) |
|---|---|---|---|---|---|
| 1 | 1.0 mm/min | 3100.7 | upper-joint | 0.5 | 2 |
| 2 | 1.0 mm/min | 2649.4 | lower-socket | 0.5 | 2 |
| 3 | 10.0 mm/min | 2937.9 | upper-socket | 0.5 | 2 |
| 4 | 10.0 mm/min | 2946.6 | upper-joint | 0.5 | 2 |
| 5 | 10.0 mm/min | 2871.6 | lower-joint | 0.5 | 2 |

Mean Load @ Failure 2901.24
Standard Deviation 163.927

TABLE VI

B. Joint Strength Test (using stripping fixture)

| Sample<br>No. | Pull rate | Max<br>Load (N) | Fail Mode<br>Joint Joint | Groove<br>Size<br>(mm) | Groove<br>Spacing<br>(mm) |
|---|---|---|---|---|---|
| 6 | 10.0 mm/min | 3940.4 | upper | 0.5 | 2 |
| 7 | 10.0 mm/min | 3902.9 | lower | 0.5 | 2 |
| 8 | 10.0 mm/min | 3724.3 | lower | 0.5 | 2 |
| 9 | 10.0 mm/min | 3878.4 | lower | 0.5 | 2 |
| 10 | 10.0 mm/min | 3937.4 | lower | 0.5 | 2 |

Mean Load failure 3876.68
Standard Deviation 88.962

Figure 22:
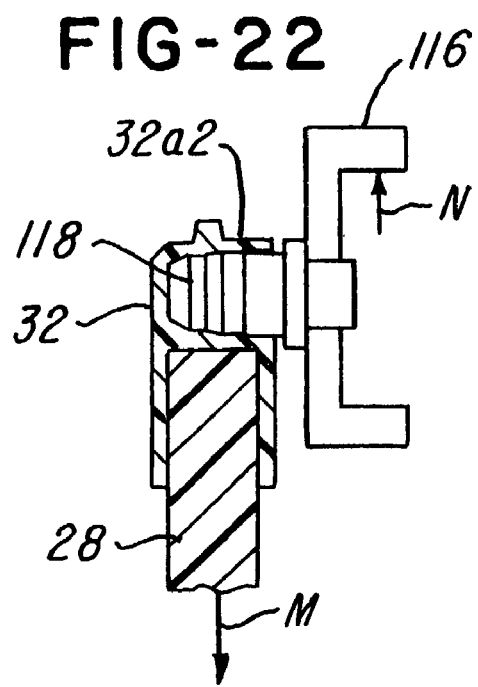
FIG. 22 is a view illustrating another test.

A second bearing strength test was conducted to test the strength of the socket 32 and length 28 and the joints therebetween. In this test, a fixture 116 (FIG. 22) having a ball 118 was provided and inserted into the socket 32 as illustrated in FIG. 22. Loads were then applied in the directions of arrows M and N until the socket wall 32a2 illustrate the results from the tests conducted. These results for the same sample are shown in Table VI.

Table VII, the arm 28 was subject to a static strength test at the loads indicated. Table VII illustrates the shear at the edge 32A1 (FIG. 21A) and the arm 28. For example, note in one test shear did not occur until an elongation of about 3 millimeters, which occurred in one test after applying a maximum load of about 3170 Newtons.

TABLE VII

CWL Static Strength (Bearing) Test Results

| Max<br>Load<br>(N) | Elongation<br>(mm) | Failure<br>Mode | Groove<br>Size<br>(mm) | Groove<br>Spacing<br>(mm) |
|---|---|---|---|---|
| 3227 | 3.14 | Interface | 1.0 | 3.00 |
| 3185 | 2.99 | Interface | 1.0 | 3.00 |
| 3170 | 3.00 | Interface | 1.0 | 3.00 |
| 3097 | 2.72 | Interface | 1.0 | 3.00 |
| 3832 | 4.27 | Interface | 0.50 | 2.00 |
| 3787 | 3.74 | Interface | 0.50 | 2.00 |
| 3246 | 3.08 | Interface | 0.50 | 2.00 |
| 3149 | 3.07 | Interface | 0.50 | 2.00 |
| 3187 | 3.11 | Interface | 0.50 | 2.00 |
| 3323 | 3.41 | Interface | 0.50 | 2.00 |
| 3225 | 3.22 | Interface | 0.50 | 2.00 |
| 3379 | 3.33 | Interface | 0.50 | 2.00 |
| 3379 | 3.37 | Interface | 0.50 | 2.00 |
| 3351 | 3.34 | Interface | 0.50 | 2.00 |

Interface: failure mode is shear at the socket-link joint interface

Likewise, the following Table VIII illustrates further features of the invention showing various buckling durability tests over a repeated number of cycles and a corresponding failure mode which varied based upon the groove configuration selected. For example, various groove configurations (e.g., 4/3, 4/4, etc.), such as a staggered four on top, three on bottom configuration, were tested at various stress levels as the sockets 32 and 34 were repeatedly brought towards each other. The failure mode experienced resulted in either a delamination where outside layers of the composite material separated or where both delamination or breaking of the arm 28 occurred. Sometimes at the midspan area (i.e., towards the middle of the arm 28 between its ends 28A and 28B where maximum bending stress occurred.

TABLE VIII

CWL Specimen Buckling Durability Tests 'Failure modes:

| Groove Contiguration | Test Stress (ksi) | Test Displ (in) | Cycles | Failure Mode | Groove Size r(mm) | Groove Spacing (mm) |
|---|---|---|---|---|---|---|
| 4/3 | 90 | 0.669 | 29,457 | Delam | 1.00 | 4.00 |
| 4/3 | 80 | 0.539 | 55,000 | Both | 1.00 | 4 00 |
| 4/3 | 70 | 0.422 | 240,000 | Midspan | 1.00 | 4.00 |
| 5/4 | 90 | 0.669 | 20,000 | Delam. | 0.50 | 2.00 |
| 5/4 | 80 | 0.539 | 40,722 | Both | 0.50 | 2.00 |
| 5/4 | 70 | 0.422 | 291,902 | Both | 0.50 | 2.00 |
| 5/4 | 80 | 0.539 | 40,000 | Delam. | 0.50 | 2.00 |
| None | 100 | 0.812 | 15,000 | Midspan | | |
| None | 90 | 0.669 | 25,000 | Midspan | | |
| None | 80 | 0.539 | 100,000 | Midspan | | |
| 414 | 90 | 0.669 | 25,000 | Midspan | 0.50 | 3.00 |
| 4/4 | 95 | 0.739 | 30,000 | Midspan | 0.50 | 3.00 |
| 4/4 | 100 | 0.812 | 15,000 | Midspan | 0.50 | 3.00 |
| 4/4 | 85 | 0.603 | 30,000 | Midspan | 0.50 | 3.00 |
| 4/4 | 80 | 0.539 | 60,000 | Midspan | 0.50 | 3.00 |
| 4/4 | 75 | 0.479 | 160,000 | Midspan | 0.50 | 3.00 |
| 4/4 | 70 | 0.422 | 210,000 | Midspan | 0.50 | 3.00 |
| 4/4 | 95 | 0.739 | 25,000 | Midapan | 0.50 | 3.00 |
| 4/4 | 85 | 0.603 | 25,000 | Midspan | 0.50 | 3.00 |

1. Delamination: outside layers delaminated (separated) from link 28
2. Both: Delamination + breaking
3. Midspan: fiber break at the outmost layer of middle span where maximum bending stress occurred.

The results in Tables V through VIII illustrate the strength and durability of the interlocking joint provided by the groove design between the sockets 32 and 34 and the arm 28 to which they are over molded. Moreover, the sockets 32 and 34 resisted separation from the ends of the arm 28 both in a static, non bending state as well as in a buckling or bent state during which a fatigued condition on the windshield would normally be occurring.

While the method herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A windshield wiper drive linkage for use in a wiper system comprising:
   a plurality of linkage arms;
   at least one of said plurality of linkage arms comprising a composite flexible arm having a first end and a second end; said composite flexible arm bending to facilitate preventing damage to components in said wiper system when a compressive load applied to said at least one of said plurality of linkage arms exceeds a predetermined load as a result of a fatigue condition; and
   a connector overmolded onto at least one of said first end or said second end;
   said at least one of said plurality of linkage arms comprising a first side and a second side; each of said first and second sides comprising a plurality of grooves that are semi-circular to facilitate providing an interlocking joint when said connector is overmolded onto said at least one of said first and second ends, each of said plurality of grooves being generally perpendicular to a length of said arm and generally parallel to an axis of rotation of a socket defined by said connector;
   said plurality of grooves providing a plurality of areas for receiving a portion of said connector when it is overmolded thereon to provide said interlocking joint.

2. The windshield wiper drive linkage as recited in claim 1 wherein said flexible arm comprises a modulus of elasticity of at least 50,000 psi.

3. The windshield wiper drive linkage as recited in claim 1 wherein said predetermined load is approximately 30 percent higher than a highest working load.

4. The windshield wiper drive linkage as recited in claim 3 wherein said flexible arm comprises a length of approximately 250 mm or more.

5. The windshield wiper drive linkage as recited in claim 1 wherein said predetermined load is approximately 300 Newton or higher.

6. The windshield wiper drive linkage as recited in claim 1 wherein said flexible arm comprises a pultruded composite comprising 40–60 percent (in weight) glass fibers.

7. The windshield wiper drive linkage as recited in claim 1 wherein said flexible arm is rectangular in cross section.

8. The windshield wiper drive linkage as recited in claim 1 wherein said first end is coupled to a drive arm and said second end is coupled to a driven arm;
   said first end and said second end defining a first distance when said compressive load is less than said predetermined load and defining a second distance when said compressive load exceeds said predetermined load, wherein said second distance is less than said first distance.

9. The windshield wiper drive linkage as recited in claim 1 wherein said compressive load remains substantially constant as said flexible arm shortens at least 25 mm after said compressive load exceeds said predetermined load.

10. The windshield wiper drive linkage as recited in claim 9 wherein said flexible arm is a fiber-reinforced composite or thermoset carrier.

11. The windshield wiper drive linkage as recited in claim 1 wherein a first set of said plurality of grooves being situated adjacent said first end and a second set of said plurality of grooves being situated adjacent said first end, said connector becoming integrally formed in said first and second sets of said plurality of grooves when it is overmolded onto said first end.

12. The windshield wiper drive linkage as recited in claim 11 wherein the first and second sets comprise the same number of grooves.

13. The windshield wiper drive linkage as recited in claim 11 wherein the first and second sets comprise a different number of grooves.

14. The windshield wiper drive linkage as recited in claim 11 wherein the first set comprises at least 3 grooves and said second set comprises at least 4 grooves.

15. The windshield wiper drive linkage as recited in claim 1 wherein said grooves are substantially linear and extend substantially perpendicular to an axis of said arm.

16. The windshield wiper drive linkage as recited in claim 1 wherein said grooves are substantially linear and extend substantially perpendicular to an axis of said arm.

17. The windshield wiper drive linkage as recited in claim 1 wherein said connector comprises a ball socket.

18. A wiper system comprising:
   a first wiper;
   a second wiper;
   a windshield wiper drive linkage coupled to said first and second wipers;
   a drive motor coupled to said windshield wiper drive linkage; and said windshield wiper drive linkage comprising:

a plurality of linkage arms coupled to said first and second wipers and said drive motor;

at least one of said plurality of linkage arms comprising a composite flexible arm having a first end and a second end; said composite flexible arm bending to facilitate preventing damage to components in said wiper system when a compressive load applied to said at least one of said plurality of linkage arms exceeds a predetermined load as a result of a fatigue condition; and a connector overmolded onto at least one of said first end or said second end;

said at least one of said plurality of linkage arms comprising a first side and a second side, each of said first and second sides comprising a plurality of grooves that are semi-circular to facilitate providing an interlocking joint when said connector is overmolded onto said at least one of said first and second ends, each of said plurality of grooves being generally perpendicular to a length of said arm and generally parallel to an axis of rotation of a socket defined by said connector;

said plurality of grooves providing a plurality of areas for receiving a portion of said connector when it is overmolded thereon to provide said interlocking joint.

19. The wiper system as recited in claim 18 wherein said flexible arm comprises a modulus of elasticity of at least 50,000 psi.

20. The windshield wiper drive linkage as recited in claim 18 wherein said predetermined load is approximately 30 percent higher than highest working load.

21. The windshield wiper drive linkage as recited in claim 20 wherein said flexible arm comprises a length of approximately 250mm or more.

22. The windshield wiper drive linkage as recited in claim 18 wherein said predetermined load is approximately 300 Newton or higher.

23. The windshield wiper drive linkage as recited in claim 18 wherein said flexible arm comprises a pultruded composite comprising 40–60 percent (in weight) glass fibers.

24. The windshield wiper drive linkage as recited in claim 18 wherein said flexible arm is rectangular in cross section.

25. The windshield wiper drive linkage as recited in claim 18 wherein said first end is coupled to a drive arm and said second end is coupled to a driven arm;

said first end and said secondend defining a first distance when said compressive load is less than said predetermined load and defining a second distance when said compressive load exceeds said predetermined load, wherein said second distance is less than said first distance.

26. The windshield wiper drive linkage as recited in claim 18 wherein said compressive load remains substantially constant as said flexible arm shortens at least 25 mm after said compressive load said predetermined load.

27. The windshield wiper drive linkage as recited in claim 26 wherein said flexible arm is a fiber-reinforced composite or thermoset carrier.

28. The windshield wiper drive linkage as recited in claim 18 wherein a first set of said plurality of grooves being situated adjacent said first end and a second set of said plurality of grooves being situated adjacent said first end, said connector becoming integrally formed in said first and second sets of said plurality of grooves when it is overmolded onto said first end.

29. The windshield wiper drive linkage as recited in claim 28 wherein the first and second sets comprise the same number of grooves.

30. The windshield wiper drive linkage as recited in claim 28 wherein the first and second sets comprise a different number of grooves.

31. The windshield wiper drive linkage as recited in claim 28 wherein the first set comprises at least three grooves and said second set comprises at least four grooves.

32. The windshield wiper drive linkage as recited in claim 18 wherein said plurality of grooves are substantially linear and extend substantially perpendicular to an axis of said arm.

33. The windshield wiper drive linkage as recited in claim 18 wherein said plurality of grooves are substantially linear and extend substantially perpendicular to an axis of said arm.

34. The wiper system as recited in claim 18 wherein said connector comprises a ball socket.

* * * * *